United States Patent [19]

Joyce, Jr.

[11] 4,279,319
[45] Jul. 21, 1981

[54] HYDRAULIC CONTROL SYSTEM FOR VEHICLE AXLE SUSPENSION

[75] Inventor: Hardin Joyce, Jr., Springfield, Ill.

[73] Assignee: Fiat-Allis Construction Machinery, Inc., Deerfield, Ill.

[21] Appl. No.: 60,829

[22] Filed: Jul. 25, 1979

[51] Int. Cl.³ .................. B60D 7/02; B60G 11/30; B60G 17/06; B60G 17/08
[52] U.S. Cl. ............................ 180/12; 180/14 R; 180/266; 280/6.1; 280/6 H; 280/111; 280/112 R; 280/483; 280/484; 280/492; 280/702
[58] Field of Search ............... 180/12, 14 R, 41, 266; 280/104, 111, 112 R, 112 A, 6.1, 6.11, 6 H, 483, 484, 489, 492, 494, 702, 708, 709

[56] References Cited

U.S. PATENT DOCUMENTS

| | | | |
|---|---|---|---|
| 2,720,417 | 10/1955 | Kling | 280/492 |
| 3,118,686 | 1/1964 | McAdams | 280/702 |
| 3,135,529 | 6/1964 | Conrad | 180/12 |
| 3,549,168 | 12/1970 | Swanson | 280/702 |
| 3,643,970 | 2/1972 | Gauchet | 280/709 |
| 3,827,518 | 8/1974 | Kuhl et al. | 180/12 |
| 3,869,141 | 3/1975 | Ito et al. | 280/708 |
| 3,953,040 | 4/1976 | Unruh et al. | 280/6 H |
| 4,045,050 | 8/1977 | Hawk | 280/492 |

Primary Examiner—David M. Mitchell
Assistant Examiner—Donn McGiehan
Attorney, Agent, or Firm—August E. Roehrig, Jr.; Robert A. Brown

[57] ABSTRACT

A control circuit for controlling the hydraulic suspension system of an articulated vehicle having a first pair of hydraulic cylinders operatively connected between a drive axle and a tractor frame to control vertical bounce movement of the axle, and a second pair of hydraulic cylinders operatively connected between a tractor and a trailer portion of the articulated vehicle for controlling relative roll movement therebetween. A first valve system directs hydraulic fluid under a first pressure to the head ends of the hydraulic cylinders for supporting the weight of the vehicle and load, and to dampen the bounce motion of the drive wheels and the relative roll motion between the tractor and trailer portions of the articulated vehicle. A gas precharged accumulator and a plurality of flow restrictors disposed in this portion of the circuit, control and spring and viscous damping rates of the cylinders. A pressure reducer communicates hydraulic fluid under a second pressure, lower than the first pressure, to the rod ends of the hydraulic cylinders and to a second gas precharged accumulator. The second gas precharged accumulator functions to insure that the rod ends of the hydraulic cylinders remain oil filled, which allows double action of the cylinders and provides cushioning for the rebound portion of the system.

A sensor system maintains an oil pressure differential between the high and low pressure circuits effective to maintain a range of predetermined vertical positions of the portions of the vehicle regardless of the weight of the load being received, carried by, or discharged from the scraper bowl. A selectively activated lockout switch is controlled by the vehicle operator to actuate a second valve system for hydraulically fixing the bounce damping control cylinders in position to isolate them from the spring and viscous damping portions of the control system. Fluid flow between the roll damping hydraulic cylinders is uninterrupted to maintain control of the relative roll motion between the articulated vehicle members.

11 Claims, 2 Drawing Figures

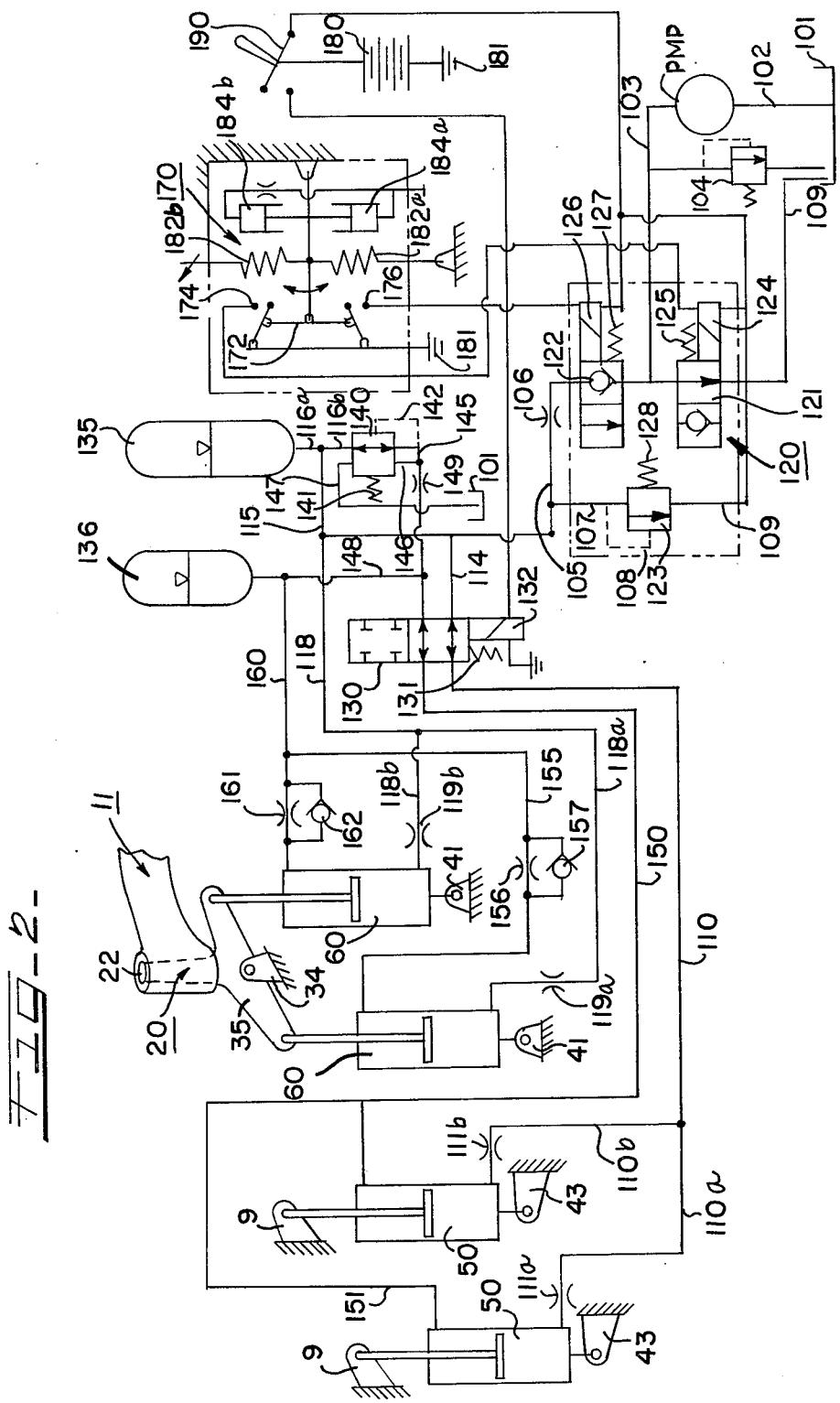

HYDRAULIC CONTROL SYSTEM FOR VEHICLE AXLE SUSPENSION

BACKGROUND OF THE INVENTION

This invention relates in general to control circuits for hydraulic systems and, in particular, to a control circuit for controlling a hydraulic vehicular suspension system.

More specifically, but without restriction to the particular use which is shown and described, this invention relates to a control circuit for a hydraulic vehicle suspension system used on an articulated earthmoving scraper for minimizing the bouncing, pitching, and rolling motions encountered during vehicle operation.

Articulated wheel scrapers comprise, typically, a single axle tractor connected by a pivotal yoke mounting or hitch to a single axle trailer having a scraper bowl portion. Such vehicles operate in one of three modes; loading, transporting and unloading. As will be hereinafter discussed in detail, the vehicle suspension system must satisfy different requirements of each of these operating modes. One suitable hydraulic suspension system for articulated scrapers has been described in the inventor's co-pending patent application, Ser. No. 883,804, filed Mar. 6, 1978 now U.S. Pat. No. 4,201,273, the disclosure of which is incorporated herein by reference.

In many applications, articulted scrapers transport heavy loads of material over irregular terrain at relatively high speeds. During the transporting operation, shock forces are transmitted through the tires to the vehicle frame and, in turn, to the vehicle operator. Since transmission of such shock forces is discomforting and potentially dangerous to the machine operator, it is desirable to dampen these forces by means of a suitable suspension system. In addition, when the vehicle is loading, the loading action is improved by insuring that the driving wheels remain in a positive driving traction with the vehicle supporting surface. To this end it is desirable to permit a certain controlled degree of relative rotation, generally referred to as roll or tilt, of the tractor and trailer relative to each other about an axis extending longitudinally through the vehicle and generally parallel to the vehicle support surface. Since the resilient suspension system is most needed at higher speeds, the loading action is also improved by locking out the suspension system during loading operation. The shock absorbing and cushioning members of the suspension system are hydraulically maintained inoperative and fluctuations in the relative position of the trailer bowl and its forward cutting edge are minimized.

Another problem encountered as the vehicle is being loaded and unloaded, results from the constantly changing volume and weight of materials contained in the trailer as it is being received into or discharged from the scraper bowl. This continuous weight change causes the level of the scraper bowl to vary relative to the tractor and the vehicle supporting surface. As the weight of the material contained in the scraper bowl increases during the loading operation, the bowl tends to sink. Conversely, as the loaded material is discharged during the unloading operation, the weight of the load constantly decreases and the scraper bowl rises. The hydraulic forces supporting the vehicle raise the supported elements upwardly away from the vehicle supporting surface. The resulting cut, or the distribution of the material in the unloading operation at the dump site, will be uneven due to the cushioning and viscous damping characteristics of the vehicle suspension system. Therefore, it is desirable to maintain the bowl level within a predetermined range of movement relative to the tractor and supporting surface during loading and unloading operation.

U.S. Pat. No. 3,643,970 discloses a suspension system which locks out the vehicle suspension system while on a job site and releases it to increase stability for road travel. However, the system disclosed therein does not provide for damping the pitch or roll between the tractor and trailer members.

Systems such as disclosed in U.S. Pat. No. 3,869,141 have attempted to prevent the deterioration of vehicle driveability through controlling hydraulic cylinders operatively connected between the axle and the vehicle frame. Such systems increase resistance to rolling and pitching during high speed turns, acceleration and deacceleration, by controlling the volume of pressurizing gas or isolating the hydraulic fluid within the suspension struts by means of the horizontal forces acting on a weight suspended from a control valve. However, such a system does not compensate for changes in the vehicle position relative to the vehicle supporting surface, caused by the changing weight of the work material being received into or unloaded from the vehicle.

Another attempt to solve this problem is disclosed in U.S. Pat. No. 3,953,040 which describes a suspension system for wheel scrapers which dampens the shock and bounce motions encountered during the transporting operation, and has a lockout feature for locking out the vehicle suspension during loading. However, this system provides only limited control of the rolling or tilting motion between the tractor and trailer portions of the vehicle.

SUMMARY OF THE INVENTION

It is, therefore, an object of this invention to improve control circuits for hydraulic systems.

Another object of this invention is to improve control circuits for vehicle hydraulic suspension systems.

A further object of this invention is to improve control circuits for earthmoving vehicle hydraulic suspension systems.

Still another object of this invention is to improve control circuits for controlling the bouncing, pitching and rolling motions encountered during operation of an articulated vehicle.

Yet another object of this invention is to improve loading, transporting and unloading operations of an earthmoving vehicle.

These and other objects are attained in accordance with the present invention wherein there is provided a control circuit for a hydraulic suspension system which includes a plurality of hydraulic cylinders operatively connected to portions of a vehicle for dampening undesirable movement.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 2 is a fluid schematic of the hydraulic control circuit which controls a vehicle suspension system such as illustrated in FIG. 1.

DESCRIPTION OF THE PREFERRED EMBODIMENT

Figure 1:
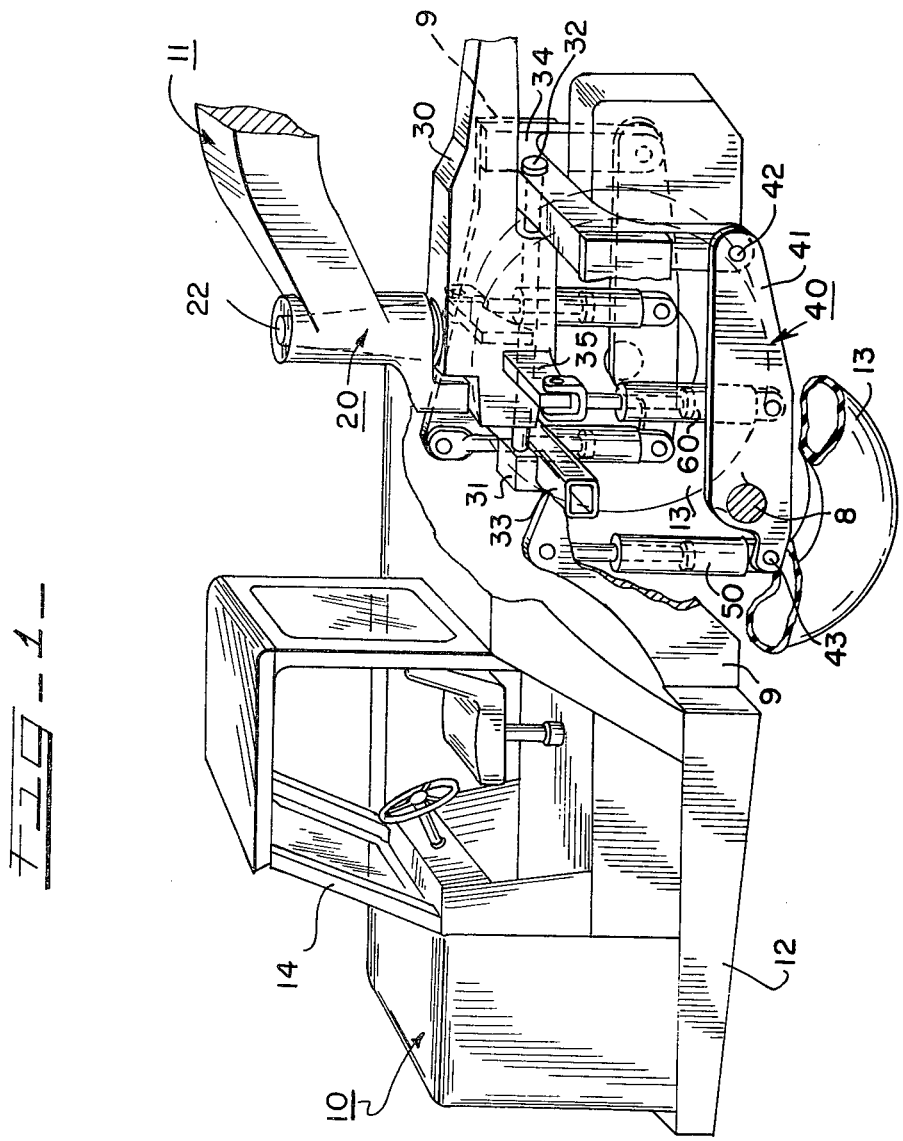
FIG. 1 is a perspective view of an articulated wheel scraper having portions removed to better illustrate the components of the vehicle suspension system.

Referring now to FIG. 1 there is shown a portion of a construction machine or earthmoving vehicle commonly referred to as a wheeled scraper. Although the suspension system disclosed herein may be used with various vehicles, for convenience of illustration, the preferred embodiment is illustrated with references to its use with a four-wheel, two-axle tractor scraper.

Generally, such a scraper includes a draft or a tractor portion 10 and a drawn or a trailer portion 11 (only a part of which is shown in FIG. 1). The trailer portion 11 includes a scraper bowl, not shown in the drawings, which is supported at its rear end by a pair of wheels and at its front end by the tractor portion 10.

The tractor 10 of the scraper is supported by a pair of drive wheels 13 and includes an operator cab 14 having an instrument and control panel conveniently located within the reach of the machine operator for controlling the vehicle as well as to monitor or adjust various accessory or auxiliary equipment of the tractor scraper for effecting desired operations. As shown in FIG. 1, the trailer 11 is joined mechanically to the tractor portion 10 by means of a coupling hitch which is shown generally by the numeral 20. The coupling hitch 20 has suitable bearing surfaces for receiving a vertical king pin or coupling shaft 22 which forms part of the hitch 20.

A base portion of the vertical king pin or coupling shaft 22 is secured to a horizontal hitch pin housing 30. A horizontally extending pivot pin 32 is journalled in the hitch pin housing 30 and permits the tractor portion 10 and the trailer portion 11 to tilt or roll relative to each other about a horizontal axis extending longitudinally through the pivot pin 32. A support block 31 is carried by a cross beam 33, secured between a pair of parallel sides 9 of a tractor main frame 12, and is adapted to receive the forward portion of the pivot pin 32. A rear pin support bearing is carried by an inverted U-shaped beam 34, similarly secured between the parallel sides 9 of the tractor main frame 12, and is adapted to receive the rear portion of the pivot pin 32.

The vehicle suspension system includes a tractor drive wheel axle support, shown generally by the numeral 40, which is pivotally connected either directly or indirectly to a rear portion of the tractor main frame to allow the tractor drive wheels 13 to move vertically relative to the tractor portion 10. The tractor drive wheel axle support 40 includes a pair of suspension support arms 41, the forward portions of which support a tractor drive wheel axle 8 which carries and is operatively connected to the tractor drive wheels 13 providing rotary driving power thereto. In the embodiment shown, the opposite ends of the suspension support arms 41 are connected to the inverted U-shaped beam 34 by means of pivot connections 42. In this manner the tractor drive wheels 13 are free to move vertically and independently relative to the tractor main frame 12 about the pivotal connections 42.

In order to oppose and dampen the vertical oscillations of the tractor drive wheels 13, a pair of bounce or pitch damping hydraulic cylinders 50 are each connected between a forwardly extending ear portion 43 of the suspension support arms 41, and one of two side portions 9 of the tractor main frame 12. The spring and viscous damping characteristics of the bounce damping cylinders 50 absorb and cushion shock and vibrations transmitted to the vehicle by the wheels 13.

It is also desirable to dampen and limit the amount of roll or tilt between the tractor portion 10 and the trailer portion 11 of the scraper. To this end the hitch pin housing 30 has a pair of tilt limiting arms 35 secured thereto which extend laterally outward therefrom transverse to the pivot axis which extends longitudinally through the housing. The tilt limiting arms 35, each have a roll or tilt dampening hydraulic cylinder 60 pivotally connected between a distal end thereof and the suspension support arms 41 of the tractor drive wheel axle support frame 40. In this manner, as the tractor portion 10 and the trailer portion 11 roll or tilt relative to each other about the longitudinally extending hitch pin axis, the movement will be dampened through the double acting roll or tilt damping cylinders 60.

Referring now to FIG. 2, there is illustrated a fluid schematic diagram of the suspension system and associated control circuit for controlling the bounce damping, tilt or roll damping, and automatic load levelling of the vehicle and the system lockout. A pump PMP delivers hydraulic fluid from a reservoir or sump 101 via an input conduit 102. The fluid is supplied at high pressure via an output conduit 103 to a first valve group or system shown generally by the numeral 120. A pressure relief valve 104 is coupled between the output conduit 103 and the sump 101 to protect the hydraulic circuit from excess pressure and to prevent overloading the pump PMP. The valve group 120 includes a pair of two-position valves 121, 122 each actuated by a solenoid 124 and 126, respectively, and a pilot-operated pressure relief valve 123 which protects the pump PMP from excessive pressures and shock forces induced in the control circuit during vehicle operation. A spring 125 biases the valve 121 to a position in which it is in fluid communication with a return conduit 109 which in turn is in fluid communication with the reservoir or sump 101. Similarly, a spring 127 biases the valve 122 to a position which communicates hydraulic fluid from the conduit 103 and through a check valve via a conduit 105 to conduits 107 and 114.

The conduit 107 is in fluid communication with a pilot conduit 108 and the pressure relief valve 123, which is biased to a closed position by a biasing spring 128. The pressure relief valve 123 is actuable to effect fluid communication with the reservoir 101 via the return conduit 109 to relieve excessive back pressure surges caused by shock forces transmitted from the driving wheels 13 to the suspension system and control circuit.

The conduit 110 is in fluid communication with a pair of conduits 110a and 110b which communicate high pressure fluid to the head ends of the bounce dampening cylinders 50. A plurality of line restrictors 106, 111a and 111b are disposed in this bounce damping portion of the hydraulic circuit to control its spring and viscous damping characteristics.

Conduit 110 is in fluid communication with a solenoid operated lockout valve 130 which, in the position shown in FIG. 2, communicates high pressure hydraulic fluid from conduit 105 through line 114 to conduits 110, 115 and 118. The conduit 115 communicates high pressure fluid through a pair of conduits 116a, 116b to a gas precharged lift accumulator 135 and a pressure regulator 140, respectively. The pressure in the lift accumulator 135 is communicated to the head ends of the bounce damping cylinders 50 via the conduits 116a, 115, 114, 110, 110a and 110b and is held at a level sufficient to support the vehicle and any load being carried in the scraper bowl. The pressure regulator 140 reduces the high pressure in conduit 116 to a lower average pressure, by means of a line restrictor 149, which is communicated to a rebound accumulator 136 via a pair of conduits 145, 148. The lower pressure in the rebound accumulator 136 is communicated to the rod ends of the bounce and roll damping cylinders 50 and 60, respectively, to allow double action of these cylinders. Furthermore, the pressure differential thus established between the rod and head ends of these cylinders supports the weight of the vehicle, and any load contained in the bowl, preferably at a mid position within the allowable range of relative drive axle frame movement. A pilot line 142 cooperates with the line restrictor 149, disposed in the conduit 145, in limiting transmission of sudden pressure surges and shock forces induced in the circuit by operation of the vehicle.

The high pressure hydraulic fluid from the pump PMP and the lift accumulator 135 is communicated to the head ends of the tilt damping cylinders 60 by the conduit 118 via a pair of conduits 118a, 118b. The tilt damping cylinders 60 assist the bounce damping cylinders 50 in supporting the vehicle and the load, and dampen and limit the relative roll motion between the tractor and trailer portions of the scraper. A plurality of line restrictors 119a, 119b disposed in the lines 118a, 118b, respectively, cooperate with a plurality of line restrictors 156, 161 disposed in a pair of return conduits 155, 160, respectively, in controlling the spring and damping rates in the roll damping portion of the circuit by restricting the flow of hydraulic fluid as it is forced from either one of the respective ends of the roll damping cylinders 60 by relative motion between the tractor 10 and trailer 11 portions of the vehicle.

The pressure in the gas precharged rebound accumulator 136 is communicated to the rod ends of the bounce damping cylinders 50 via the conduit 148, the lockout valve 130, and the conduits 150, 151. Rebound pressure is communicated to the rod ends of the roll damping cylinders 60 via the conduits 160 and 155. The precharged pressure in the rebound accumulator 136 is sufficient to insure that the rod ends of the bounce and tilt damping cylinders 50 and 60, respectively, remain oil filled to allow double action use of these cylinders and to insure rapid and effective response to the vertical motion of the axle 8 and wheels 13.

A sensor, shown generally by the numeral 170, is used for maintaining an oil pressure differential between the high and low pressure circuits to support the tractor with the drive axle in a mid position or within a predetermined range of positions relative to the tractor regardless of the weight of the load being received, carried, or discharged from the scraper bowl. The sensor 170 includes a sensor switch 172 having a portion affixed to, for example, the tractor frame 12 and a movable portion pivotally connected to the axle portion of the tractor. The switch 172 has a pair of contacts 174 and 176, located at the extremes of the desired range of vertical movement of the drive axle relative to the tractor frame. When the circuit is closed by either of the two extreme positions being attained, due, for example, to a change in the weight of the material in the bowl, an electrical current is established between battery 180 and ground 181 which selectively energizes one or the other of the solenoids 124 or 126. For example, if the vehicle drops too low with respect to the drive axle 8, the switch 172 completes the circuit when closing into contact 174. The solenoid 124 is activated which overrides the force of the spring 125, and the valve 121 shifts to its second position closing off fluid flow to the reservoir 101. The entire volume of fluid provided by the pump PMP is directed to the head ends of the bounce and tilt damping cylinders 50 and 60 which lifts the vehicle frame, including the bowl and load, until electrical contact with contact 174 is broken. The system then returns to the equilibrium configuration as shown in FIG. 2.

Similarly, if the vehicle is riding too high with respect to the drive axle 8, an electrical circuit is established through contact 176. Solenoid 126 is activated which overrides the force of the spring 127, and the valve 122 shifts to its second position. Hydraulic fluid from the head ends of the bounce and tilt damping cylinders 50 and 60 is permitted free return to the reservoir 101, and the vehicle frame and bowl is lowered until contact at point 176 is broken. The system then returns to the equilibrium configuration as shown in FIG. 2. A pair of springs 182a and 182b cooperate with a pair of dashpots 184a and 184b, respectively, to filter out minor bounce motion of the drive axle 8 to the sensor 170 thereby insuring smooth operation of the system. As hereinafter discussed in detail, a lockout switch 190 is provided to lock out the resilient characteristics of the suspension system during the loading operation to improve the quality of the cut.

While the operation of the present invention is believed clearly apparent from the foregoing description, its operation is briefly summarized as follows. Referring again to FIG. 2, with the lockout switch 190 in the illustrated open position, and the levelling sensor 170 in an intermediate position, the pump PMP receives hydraulic fluid from the reservoir 101 via the conduit 102. The pump communicates the pressurized hydraulic fluid through the conduit 103 to each of the two position valves 121 and 122 of the first valve group 120. The valve 121 returns a portion of the hydraulic fluid to reservoir 101 via conduit 109. The valve 122 directs the remaining portion of the hydraulic fluid via conduit 105 to conduit 110, where it is further divided between the head ends of the bounce damping cylinders 50 via the pair of conduits 110a, 110b and the head ends of the tilt damping cylinders 60 via conduits 114, 118, 118a and 118b.

The conduits 115, 116a communicate the high pressure fluid to the lift accumulator 135 which cooperates with the line restrictors 111a, 111b, 119a and 119b in providing the spring and viscous damping characteristics of the suspension system. The lift accumulator 135 and the pump PMP maintain the desired pressure in the head ends of the cylinders 50 and 60 required to maintain the vehicle frame 12 within the desired range of preselected positions with respect to the drive axle 8.

The pressure regulator valve 140 has a dual function. Firstly, it provides a reduced average hydraulic fluid pressure to the rebound accumulator 136 via the conduits 148, 145 by means of the line restrictor 149. This lower pressure is communicated to the rod ends of the bounce damping cylinders 50 via the conduit 148, the lockout valve 130, and the conduits 150, 151. This insures that the rod ends of these cylinders remain oil filled and cushion the rebound or downward movement of the tractor drive wheels 13. Similarly, the low pressure from the rebound accumulator 136 is communicated to the rod ends of the roll or tilt damping cylinders 60 via a pair of ball check valves 157 and 162 which shunt the line restrictors 156 and 161 disposed in the conduits 155 and 160, respectively. The low pressure from the rebound accumulator 136 insures double action of the roll damping cylinders 60 and provides the desired roll cushioning effect. The line restrictor-check valve combinations on the rod ends of these cylinders, and the line restrictors on the head ends, provides the viscous damping characteristics to this portion of the circuit and permit controlled flow fluid back and forth from one cylinder to the other.

The second function of the valve 140 is to cooperate with the pressure relief valve 123 in protecting the pump PMP and the control circuit from excessive pressure surges. The line restrictor 149, disposed in the conduit 145, reduces hydraulic fluid flow back pressure in the conduit 145 during bounce motion of the axle. Any back pressure surges are coupled through the pilot line 142, and when high enough to overcome the force of the spring 141, the pressure regulator valve 140 shifts to a second position where the excessive fluid pressure in the conduit 145 is relieved to the reservoir 101 via a conduit 147. In this manner, the pressure differential between the head and rod ends of bounce damping and the roll or tilt damping cylinders, 50 and 60, respectively, support the vehicle weight and the weight of any load being carried by it. The cushioning required to maintain the desired ride characteristics and operator comfort whenever the vehicle encounters a bump, is provided by the gas precharged accumulators 135 and 136.

The lift or bounce cylinders 50 may be hydraulically locked into a rigid position during loading which is desirable for depth control of the cutting edge during loading operations through the lockout valve 130 which is activated by a manually actuable lockout switch 190. The lockout switch 190 is selectively closed by the machine operator, thereby completing an electrical circuit through lockout valve 130 between the power source or battery 180 and ground 181. The flow of current in this circuit energizes solenoid 132 which overcomes the biasing force of a spring 131 and urges lockout valve 130 into a second blocked position. With lockout valve 130 in this position, the head and rod ends of the bounce damping cylinders are hydraulically isolated from the pump PMP, the reservoir 101, and the remainder of the control circuit. The relatively equal pressures in both ends of the bounce damping cylinders 50 locks the suspension hydraulically in a rigid position. The quality of the cut made by the scraper in the locked position is therefore improved because fluctuations in the position of the cutting edge and bowl with respect to the vehicle supporting surface are eliminated. The hydraulic fluid furnished by the pump PMP is returned to the reservoir 101 via valve 121 and conduit 109. Any excessive pressure surges in conduits 110a, 110b, 110 are coupled through the pilot line 108 which is in fluid communication with the return line 107 and pressure relief valve 123. Pressure significant enough to overcome the force of the spring 128 urges pressure relief valve 123 to a second open position whereby the excessive pressures are returned to reservoir 101 via conduit 109. The roll damping characteristics provided by the pair of cylinders 60 is, thereby, unaffected because fluid flow in the lockout configuration between the respective head and rod ends of these cylinders is maintained.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control system for a hydraulic suspension system of a double-axle articulated vehicle having a tractor portion and a trailer portion, said tractor portion including a drive axle operatively connected to a tractor frame with at least one double-acting hydraulic cylinder operatively connected between the drive axle and the frame for damping vertical bounce movement therebetween, a hitch member for coupling said trailer portion to said tractor portion to permit relative rolling motion therebetween about an axis extending longitudinally through said vehicle with at least one other double-acting hydraulic cylinder operatively connected between the drive axle and the hitch member to dampen the relative rolling movement between the tractor and trailer portions about said axis, said control system comprising:

cushioning control means for controlling the spring and viscous damping characteristics of each of said double-acting hydraulic cylinders, said cushioning control means interposed in fluid communication between a source of pressurized hydraulic fluid and a first chamber of each of said double-acting hydraulic cylinders, rebound control means for controlling the spring and viscous damping characteristics of each of said double-acting hydraulic cylinders, said rebound control means interposed in fluid communication between said source of pressurized hydraulic fluid and a second chamber of each of said double-acting hydraulic cylinders, sensing means for detecting the vertical position of the tractor frame relative to the drive axle and generating a control signal responsive to the relative vertical position of the tractor frame and the drive axle, and levelling means for maintaining the tractor frame within a predetermined vertical distance relative to the drive axle, and operatively connected to said sensing means to receive said control signal for actuation in response thereto, said levelling means including valve means operable to a plurality of positions and interposed in fluid communication between said source of pressurized hydraulic fluid and the first and second chambers of said double-acting hydraulic cylinders, said valve means operable for mutually exclusively directing pressurized hydraulic fluid to said first chamber of said double-acting hydraulic cylinders and discharging pressurized hydraulic fluid from said first chamber of said double-acting hydraulic cylinders thereby modulating the flow of pressurized hydraulic fluid therefrom and thereto.

2. The control system for a hydraulic suspension system of a double-axle articulated vehicle described in claim 1 further including
selector means for selectively locking out said cushioning control means and said rebound control means during predetermined vehicle operations.

3. The hydraulic vehicle suspension control system described in claim 2 wherein said selector means for selectively locking out said cushioning control means and said rebound control means comprises a switch actuable to effect interruption of the flow of pressurized hydraulic fluid to said double-acting hydraulic cylinders.

4. The hydraulic vehicle suspension control system described in claim 3 wherein said selector means for selectively locking out said cushioning control means and said rebound control means further includes
valve means actuable by said switch for interrupting said flow of pressurized hydraulic fluid to said double-acting hydraulic cylinders.

5. The control system described in claim 1 wherein said cushioning control means includes
first accumulator means for containing a portion of pressurized hydraulic fluid and a variable volume of a precharged gas,
valve means for directing said pressurized hydraulic fluid to said first fluid chambers of said double-acting hydraulic cylinders and to said first accumulator means for containing a portion of said fluid and a variable volume of a precharged gas, and
fluid flow restricting means interposed in fluid communication between said first fluid chambers of said double-acting hydraulic cylinders and said first accumulator means for effecting the spring and viscous damping characteristics of said double-acting hydraulic cylinders.

6. The control system described in claim 1 wherein said rebound control means includes
a pressure reducer interposed in fluid communication between said source of pressurized hydraulic fluid and said second chambers of said double-acting hydraulic cylinders,
valve means for directing said pressurized hydraulic fluid to said pressure reducer,
second accumulator means for containing a portion of said reduced pressure hydraulic fluid and a variable volume of a precharged gas, said pressure reducer further being coupled in fluid communication with said second accumulator means, and
flow controlling means interposed in fluid communication between said second chambers of said double-acting hydraulic cylinders and said second accumulator means for effecting the spring and viscous damping characteristics of said double-acting hydraulic cylinders.

7. The control system described in claim 6 wherein said flow controlling means comprises at least one flow restricting orifice shunted by at least one ball check valve for directing said reduced pressure hydraulic fluid to said second chambers of said double-acting hydraulic cylinders and for preventing the flow of high pressure surges therefrom.

8. The control system described in claim 1 wherein said sensing means for detecting the vertical position of the tractor frame relative to the drive axle comprises
a normally open electrical circuit having a power source and cooperating ground means,
switch means for selectively closing said electrical circuit including a movable switch actuator operatively connected between said tractor frame and said drive axle movable in response to the relative vertical movement therebetween,
said switch means further including contacts, spaced a predetermined distance from said switch actuator for delineating a range of movement thereof to close said normally open electrical circuit when said switch actuator contacts said first or second contacts thereby generating said control signal responsive to the relative vertical position of the tractor frame and the drive axle.

9. The control system of claim 8 further including damping means for isolating said switch means from vehicle vibrations.

10. The control system described in claim 9 wherein said damping means comprises at least one dashpot coupled to at least one spring interposed between said vehicle frame and said switch means to isolate said switch means from vehicle vibrations.

11. The control system described in claim 8 wherein said movable switch actuator is operatively connected between said drive axle and said vehicle frame and has a free end movable between said switch actuator contacts for making electrical contact therewith, and
a second end portion operatively connected in said electrical circuit for completing said electrical circuit when contact is established between one of said switch actuator contacts and said movable switch actuator generating said control signal.

* * * * *